US008933657B2

(12) United States Patent
Wang et al.

(10) Patent No.: US 8,933,657 B2
(45) Date of Patent: Jan. 13, 2015

(54) CLOSED LOOP STARTUP CONTROL FOR A SENSORLESS, BRUSHLESS DC MOTOR

(75) Inventors: Xiaoyan Wang, Plano, TX (US); Yateendra Deshpande, Bryan, TX (US)

(73) Assignee: Texas Instruments Incorporated, Dallas, TX (US)

( * ) Notice: Subject to any disclaimer, the term of this patent is extended or adjusted under 35 U.S.C. 154(b) by 562 days.

(21) Appl. No.: 13/182,270

(22) Filed: Jul. 13, 2011

(65) Prior Publication Data

US 2013/0015794 A1    Jan. 17, 2013

(51) Int. Cl.
  H02P 6/06    (2006.01)
  H02P 6/20    (2006.01)
  H02P 6/18    (2006.01)

(52) U.S. Cl.
  CPC . H02P 6/20 (2013.01); H02P 6/188 (2013.01)
  USPC .................................. 318/400.06; 318/400.01

(58) Field of Classification Search
  USPC ............. 318/400.01, 400.06, 400.22, 400.29, 318/400.26, 400.34, 400.3, 400.35
  See application file for complete search history.

(56) References Cited

U.S. PATENT DOCUMENTS

| | | | | |
|---|---|---|---|---|
| 5,223,771 A | * | 6/1993 | Chari | 318/400.09 |
| 5,367,234 A | * | 11/1994 | DiTucci | 318/400.35 |
| 5,541,484 A | * | 7/1996 | DiTucci | 318/400.04 |
| 6,094,022 A | * | 7/2000 | Schillaci et al. | 318/400.35 |
| 6,249,099 B1 | * | 6/2001 | Nessi et al. | 318/400.03 |
| 7,301,298 B2 | | 11/2007 | Shao et al. | |
| 7,538,514 B2 | * | 5/2009 | Mir | 318/799 |
| 7,679,302 B1 | * | 3/2010 | Kremin et al. | 318/400.35 |
| 2010/0315029 A1 | * | 12/2010 | Kern et al. | 318/400.13 |

OTHER PUBLICATIONS

"A Novel Direct Back EMF Detection for Sensorless Brushless DC (BLDC) Motor Drives," Proc. IEEE APEC, 2002, pp. 33-38 (Jianwen Shao, Dennis Nolan, and Thomas Hopkins).

* cited by examiner

Primary Examiner — Rina Duda
(74) Attorney, Agent, or Firm — Alan A. R. Cooper; Frederick J. Telecky, Jr.

(57) ABSTRACT

A method for driving a brushless direct current (DC) motor is provided. The brushless DC motor has a first phase that is coupled between a first terminal and a common node, a second phase that is coupled between a second terminal and the common node, and a third phase that is coupled between a third terminal and the common node. The first and second phases are coupled to a first supply rail and a second supply rail, respectively, such that the brushless DC motor is in a first commutation state. The first phase is then decoupled from the first supply rail so as to allow first terminal to float during a window period. A first voltage difference between the first terminal and the second terminal is compared to a second voltage difference between the third terminal and the second terminal during the window period, and the brushless DC motor is commuted to a second commutation state if the first voltage difference is approximately equal to the second voltage difference.

13 Claims, 4 Drawing Sheets

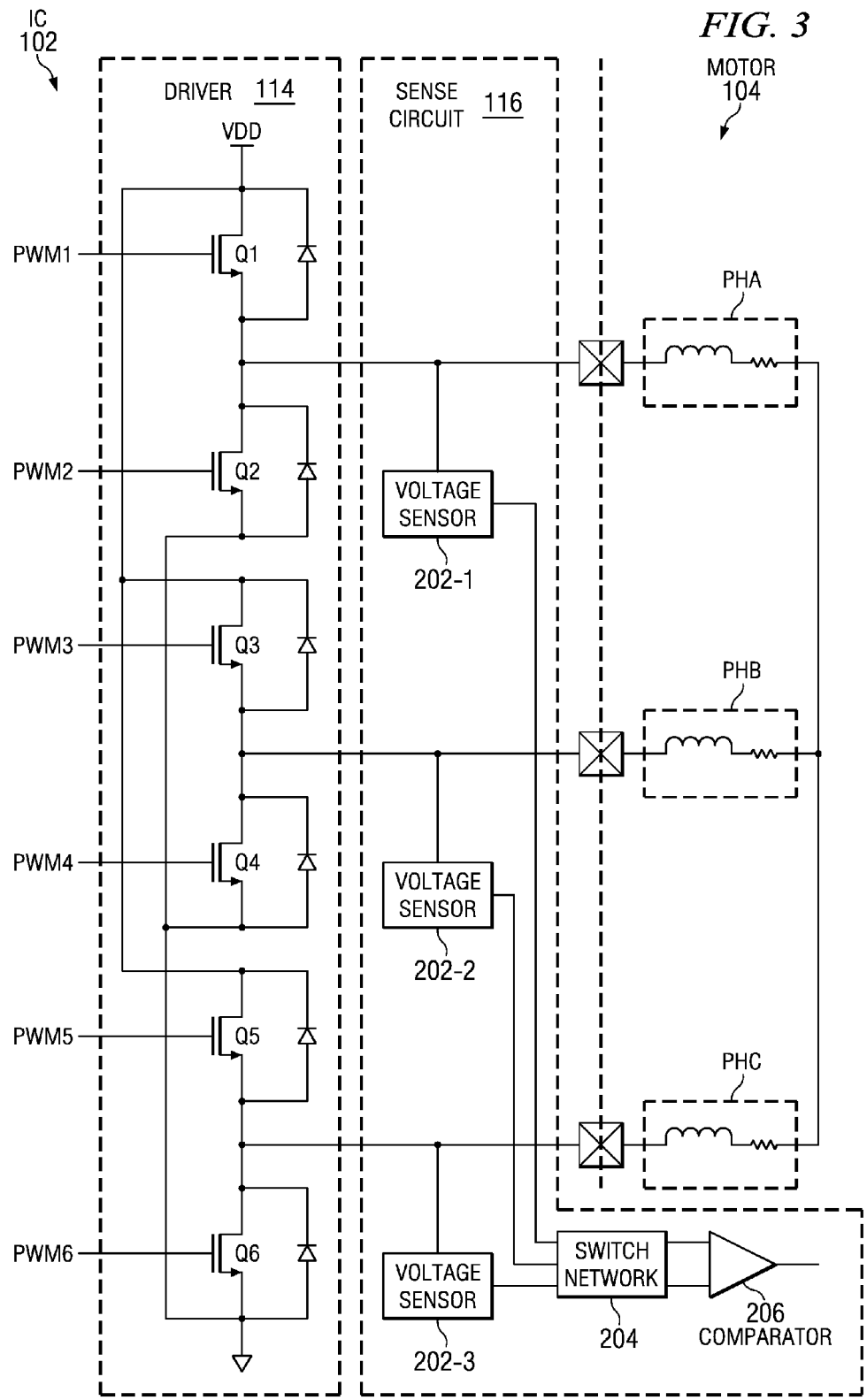

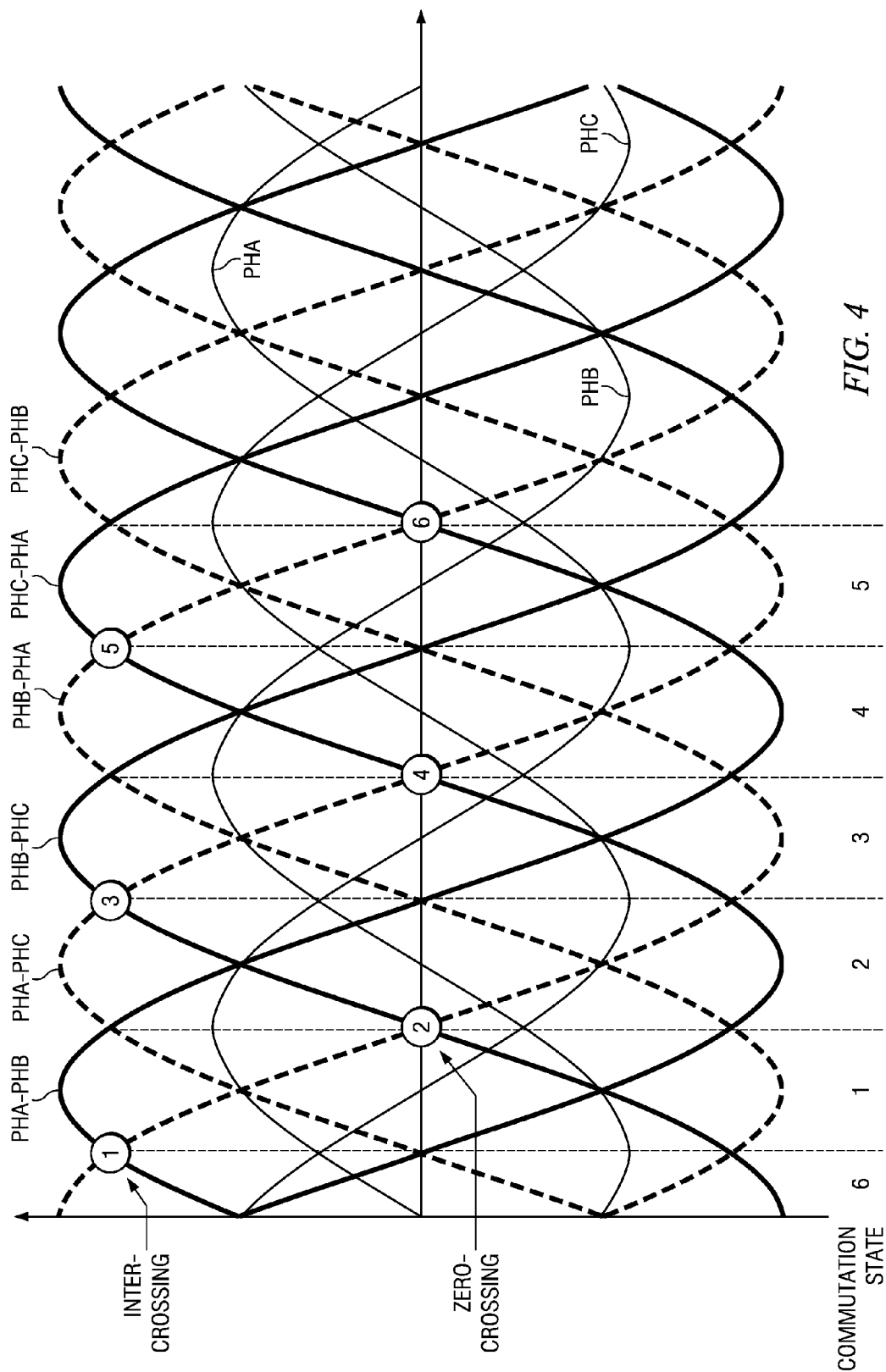

CLOSED LOOP STARTUP CONTROL FOR A SENSORLESS, BRUSHLESS DC MOTOR

TECHNICAL FIELD

The invention relates generally to control of a brushless direct current (DC) motor and, more particularly, to startup control.

BACKGROUND

There are a number of applications that employ brushless DC motors, and, in many of these applications (i.e., vehicles), there are generally two types of systems: sensorless and sensored. Sensored motors generally employ Hall sensors for rotor position detection, while sensorless, brushless DC motors use the motor as the sensor to detect rotor position. One advantage sensorless motors have is the elimination of hardware components (namely, Hall sensors), which are replaced by software. However, one disadvantage with sensorless motors is that, for speeds below a certain threshold (i.e., at startup), the motor signal is so small that it is not generally detectable. Conventional solutions generally employ open loop control at low speed or during startup, but these open loop controls may not be robust or fast enough for some applications (i.e., vehicles). Therefore, there is a need for improved startup control for a sensorless, brushless DC motor.

Some other conventional systems are: U.S. Pat. No. 7,301,298; and Shao et al., "A Novel Direct Back EMF Detection for Sensorless Brushless DC (BLDC) Motor Drives," *Proc. IEEE APEC*, pp. 33-38, 2002.

SUMMARY

An embodiment of the present invention, accordingly, provides a method for driving a brushless direct current (DC) motor having a first phase that is coupled between a first terminal and a common node, a second phase that is coupled between a second terminal and the common node, and a third phase that is coupled between a third terminal and the common node. The method comprises coupling the first and second phases to a first supply rail and a second supply rail, respectively, such that the brushless DC motor is in a first commutation state; decoupling the first phase from the first supply rail so as to allow first terminal to float during a window period; comparing a first voltage difference between the first terminal and the second terminal to a second voltage difference between the third terminal and the second terminal during the window period; and commuting the brushless DC motor to a second commutation state if the first voltage difference is approximately equal to the second voltage difference.

In accordance with an embodiment of the present invention, the method further comprises commuting the brushless DC motor to a third commutation state when the second voltage difference is approximately zero.

In accordance with an embodiment of the present invention, the second supply rail is substantially at ground.

In accordance with an embodiment of the present invention, the step of comparing further comprises coupling the first and third terminals to a comparator.

In accordance with an embodiment of the present invention, the step of commuting the brushless DC motor to the third phase further comprises coupling the comparator to ground and the third terminal.

In accordance with an embodiment of the present invention, the method further comprises: digitizing the first voltage and second voltage differences; and performing the steps of comparing in software that is embodied on a processor.

In accordance with an embodiment of the present invention, an apparatus is provided. The apparatus comprises a first supply rail; a second supply rail; a brushless DC motor having a plurality of phases that are coupled together at a common node; a plurality of drive terminals, wherein each driver terminal is coupled to at least one of the phases of the brushless DC motor; a drive circuit that is coupled to each of the drive terminals; a sense circuit that is coupled to each drive terminal; and a control circuit that is coupled to the sense circuit and the drive circuit, wherein the control circuit and the drive circuit couple a first phase of the plurality of phases and a second phase of the plurality of phases between the first and second supply rails when the brushless DC motor is in a first commutation state, and wherein the first phase is associated with a first drive terminal of the plurality of drive terminals, and wherein the second phase is associated with a second driver terminal of the plurality of driver terminals, and wherein the control circuit and the drive circuit allow the first drive terminal to float during a window period, and wherein the control circuit and sense circuit compare a first voltage difference between the first drive terminal and the second drive terminal to a second voltage difference between a third drive terminal and the second drive terminal during the window period, and wherein the third drive terminal is associated with a third phase of the plurality of phases, and the control circuit and drive circuit commute the brushless DC motor to a second commutation state if the first voltage difference is approximately equal to the second voltage difference.

In accordance with an embodiment of the present invention, the control circuit and drive circuit commute the brushless DC motor to a third commutation state when the second voltage difference is approximately zero.

In accordance with an embodiment of the present invention, the drive circuit further comprises a plurality of half-H-bridges that are each coupled to at least one of the drive terminals.

In accordance with an embodiment of the present invention, the sense circuit further comprises a plurality of voltage sensors, wherein each voltage sensor is coupled to at least one of the drive terminals.

In accordance with an embodiment of the present invention, the control circuit further comprises: an analog-to-digital converter (ADC) that is coupled to the sense circuit; a processor having a memory with a computer program embodied thereon, wherein the processor is coupled to the ADC; and a controller that is coupled between the processor and drive circuit.

In accordance with an embodiment of the present invention, the sense circuit further comprises: a switch network that is coupled to each voltage sensor; and a comparator that is coupled to the switch network.

In accordance with an embodiment of the present invention, the drive circuit further comprises: a pre-driver that is coupled to the controller; and a driver that is coupled to the pre-driver and the sense circuit.

In accordance with an embodiment of the present invention, an apparatus is provided for driving a brushless DC motor having a first phase that is coupled between a first terminal and a common node, a second phase that is coupled between a second terminal and the common node, and a third phase that is coupled between a third terminal and the common node. The apparatus comprises means for coupling the first and second phases to a first supply rail and a second supply rail, respectively, such that the brushless DC motor is in a first commutation state; means for decoupling the first phase from the first supply rail so as to allow first terminal to float during a window period; means for comparing a first voltage difference between the first terminal and the second terminal to a second voltage difference between the third terminal and the second terminal during the window period; and means for commuting the brushless DC motor to a second commutation state if the first voltage difference is approximately equal to the second voltage difference.

In accordance with an embodiment of the present invention, the apparatus further comprises means for commuting the brushless DC motor to a third commutation state when the second voltage difference is approximately zero.

In accordance with an embodiment of the present invention, the means for comparing further comprises coupling the first and third terminals to a comparator.

In accordance with an embodiment of the present invention, the means for commuting the brushless DC motor to the third phase further comprises means for coupling the comparator to ground and the third terminal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2 and 3 are diagrams of examples of the driver, motor, and sense circuit of FIG. 1; and FIG. 4 is a diagram depicting an example of the operation of the system of FIG. 1.

DETAILED DESCRIPTION

Figure 1:
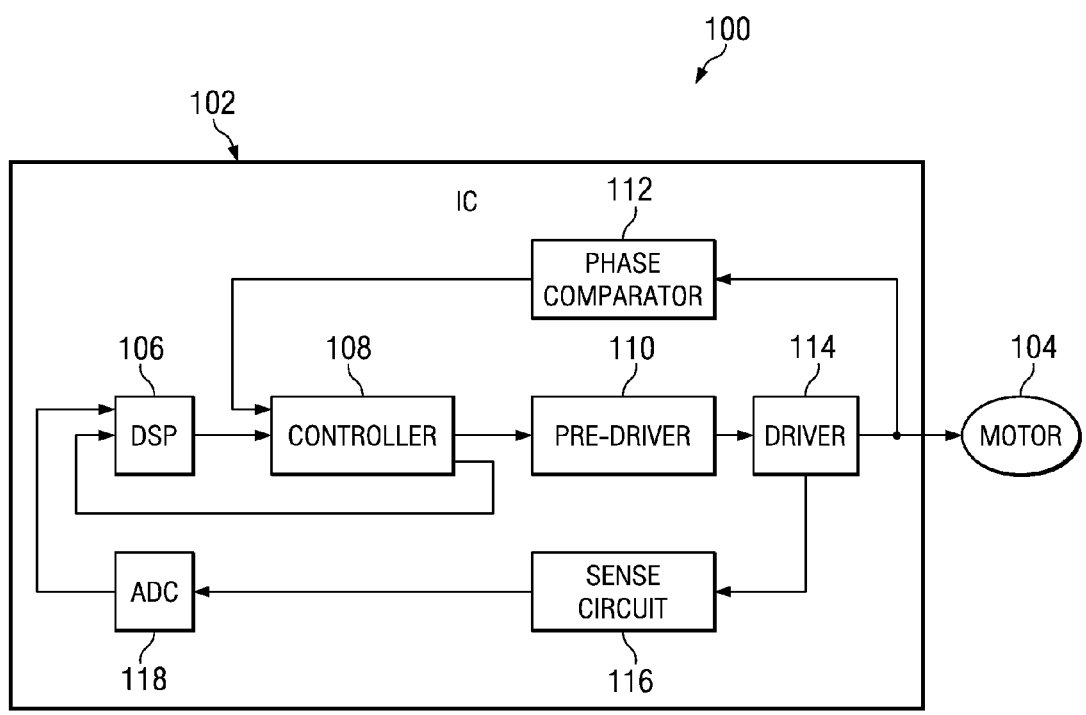
FIG. 1 is a diagram of an example of a system in accordance with an embodiment of the present invention.

Refer now to the drawings wherein depicted elements are, for the sake of clarity, not necessarily shown to scale and wherein like or similar elements are designated by the same reference numeral through the several views.

Turning to FIG. 1, a system 100 in accordance with an embodiment of the present invention can be seen. System 100 generally comprises an integrated circuit (IC) 102 and motor 104. The IC 102 generally comprises a digital signals processor (DSP) 106 (which typical includes a memory with a computer program embodied thereon), a controller 108, pre-driver 110, phase comparator 112, driver, 114, sense circuit 116, and an analog-to-digital converter (ADC) 118. In operation, the IC 102 generates an applied voltage and applied (or coil) current for the motor 104 (which can be a sensorless, brushless DC motor with any number of phases) to drive the motor 104. The motor 104 for this example (which is three-phase brushless DC motors) can generate sinusoidal back-EMF voltages for each of three phases, which are a function of velocity and rotor position and which are separated by 120 degrees. To control this motor 104, IC 102 uses the back-EMF voltage generated by the motor 104 to commute the motor 104. For example, in a three-phase DC motor, two of the phases are engaged while the third phase is in a high impedance state. Also, commutation logic (i.e., controller 108 and DSP 106) within the IC 100 generally issues a commutation clock signal that can be converted into the applied voltage (and applied or coil current) for the motor 104 by the pre-driver 110 and driver 114.

Figure 2:
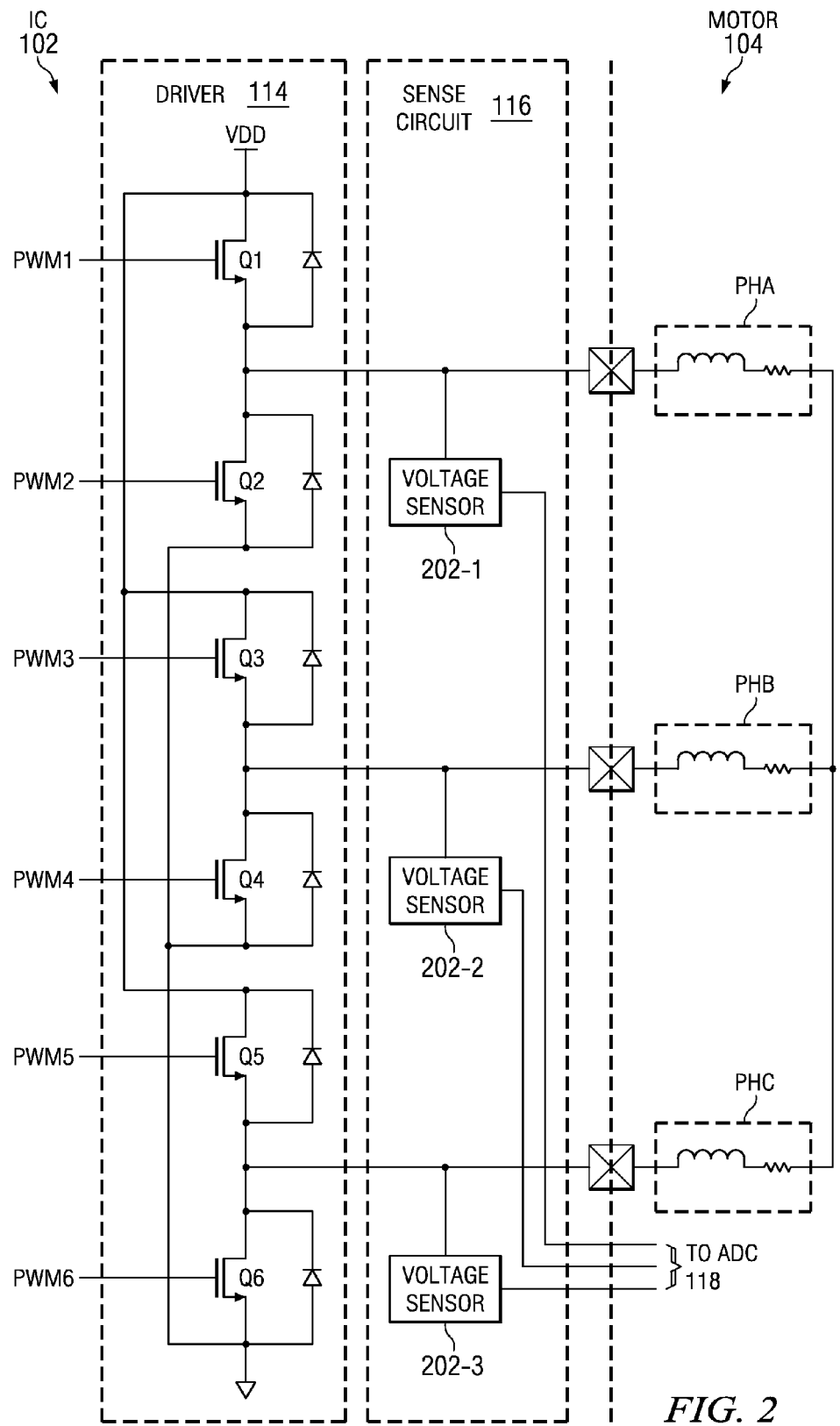

To be able to drive the motor 104, the driver 114 (as shown in FIG. 2) generally comprises three half-H-bridges (i.e., transistors Q1 through Q6) that generally function as discrete driving components for each of the phases PHA, PHB, and PHC of motor 104. When motor 104 (in this example) is being driven one of phases PHA, PHB, and PHC sources current and one of phases PHA, PHB, and PHC sinks current through the drive terminals or pins shown. For example, if current $I_{AB}$ is being supplied, transistors Q1 and Q4 would be "on," while phase PHC and its transistors Q5 and Q6 can be ignored; this allows phases PHA and PHB to be coupled between supply rails (i.e., VDD and ground). These transistors Q1 through Q6 are driven by the application of pulse width modulation (PWM) signals PWM1 to PWM6 from pre-driver 110 (which can collectively function as a drive signal for motor 104) to transistors Q1 through Q6 of driver 114. Assuming, for example, that motor 104 is a three phase motor (as shown), motor 104 would have six commutation states as shown in Table 1 below, where each commutation state would engage two of the phases.

TABLE 1

| State | Coupled to supply rail VDD | Coupled to ground |
| --- | --- | --- |
| 1 | PHA | PHB |
| 2 | PHA | PHC |
| 3 | PHB | PHC |
| 4 | PHB | PHA |
| 5 | PHC | PHA |
| 6 | PHC | PHB |

The six commutation states would progress in order (i.e., 2==>3==>4==>5==>6==>1) as the motor 104 advances.

To provide commutation advance for motor 104 during low speed or at startup (i.e., 1 revolution per minute), the control circuit (i.e., ADC 118, DSP 106, and controller 108) in conjunction with the drive circuit (i.e., pre-driver 110 and driver 114) and sense circuit 116 use line-to-line back-EMF and zero-crossing measurements. At startup (i.e., at rest), the IC 102 determines the initial rotor position of the motor 104 through back-EMF detection. Based on this initial rotor position, the proper phases are engaged, and all subsequent commutation states are based on this measurement of initial position. As an example, it can be assumed that at startup, the rotor for motor 104 is in state 6 so that phases PHC and PHB are engaged. Following engagement of the proper phases (i.e., phases PHC and PHB) for this example, a window period (which can occur several times during the engagement of the proper phase, such as phases PHC and PHB) begins where the phase coupled to the supply rail VDD is allowed to float (for example, PHC); thus, for this example, transistors Q1 and Q2 would be "off," while transistor Q4 remains "on." At this point, voltage sensors 202-1 to 202-3 (for this example) can measure the voltage at the drive terminals or pins. The terminal for the phase that is grounded (i.e., phase PHB for this example) is set as the reference voltage, and the voltage differences betweens the terminals associated with the other two phases (i.e., phases PHA and PHC in this example) and the reference (i.e., phase PHB). When the voltage differences (i.e., differences PHA-PHB and PHC-PHB) are approximately equal (labeled as point number 1 in FIG. 4 and known as an "intercrossing"), the motor 104 is ready to advance to the next commutation state (i.e., state 2 in this example). Following the transition to the next commutation state (i.e., commutation state 2 for this example), a zero-crossing for a phase (i.e., phase PHC for this example) is determined, and the motor 104 is ready to advance to the next commutation state (i.e., commutation state 3). Intercrossing and zero-crossings measurements of line-to-line back-EMF are then alternated as the motor 104 progresses through the commutation states (which can be seen in FIG. 4). As another example, if the initial position of the motor 104 corresponds to state 2, a zero-crossing measurement would first be made followed by an intercrossing measurement.

There are also several different ways in which comparisons of the voltages can be performed. As shown in FIG. 2, the measurements from each voltage sensor 202-1 to 202-3 can be digitized by ADC 118, and the comparison can be performed by software embodied on the DSP 106. Alternatively, as shown in FIG. 3, a switch network 204 and comparator 206 can be employed. The switch network 204 can calculate the difference measurements so that these measurements can be compared by the comparator 206 or can couple a phase (i.e., phase C) and ground to the comparator 206 for a zero-crossing measurement.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method for driving a brushless direct current (DC) motor having a first phase that is coupled between a first terminal and a common node, a second phase that is coupled between a second terminal and the common node, and a third phase that is coupled between a third terminal and the common node, the method comprising:
    coupling the first and second phases to a first supply rail and a second supply rail, respectively, such that the brushless DC motor is in a first commutation state;
    decoupling the first phase from the first supply rail so as to allow first terminal to float during a window period;
    comparing a first voltage difference between the first terminal and the second terminal to a second voltage difference between the third terminal and the second terminal during the window period; and
    commuting the brushless DC motor to a second commutation state if the first voltage difference is approximately equal to the second voltage difference.

2. The method of claim 1, wherein the method further comprises commuting the brushless DC motor to a third commutation state when the second voltage difference is approximately zero.

3. The method of claim 2, wherein the second supply rail is substantially at ground.

4. The method of claim 3, wherein the step of commuting the brushless DC motor to the third phase further comprises coupling the comparator to ground and the third terminal.

5. The method of claim 3, wherein the method further comprises:
    digitizing the first voltage and second voltage differences; and
    performing the steps of comparing in software that is embodied on a processor.

6. An apparatus comprising:
    a first supply rail;
    a second supply rail;
    a brushless DC motor having a plurality of phases that are coupled together at a common node;
    a plurality of drive terminals, wherein each driver terminal is coupled to at least one of the phases of the brushless DC motor;
    a drive circuit that is coupled to each of the drive terminals;
    a sense circuit that is coupled to each drive terminal; and
    a control circuit that is coupled to the sense circuit and the drive circuit,
        wherein the control circuit and the drive circuit couple a first phase of the plurality of phases and a second phase of the plurality of phases between the first and second supply rails when the brushless DC motor is in a first commutation state, and
        wherein the first phase is associated with a first drive terminal of the plurality of drive terminals, and wherein the second phase is associated with a second driver terminal of the plurality of driver terminals, and
        wherein the control circuit and the drive circuit allow the first drive terminal to float during a window period, and
        wherein the control circuit and sense circuit compare a first voltage difference between the first drive terminal and the second drive terminal to a second voltage difference between a third drive terminal and the second drive terminal during the window period, and
        wherein the third drive terminal is associated with a third phase of the plurality of phases, and the control circuit and drive circuit commute the brushless DC motor to a second commutation state if the first voltage difference is approximately equal to the second voltage difference.

7. The apparatus of claim 6, wherein the control circuit and drive circuit commute the brushless DC motor to a third commutation state when the second voltage difference is approximately zero.

8. The apparatus of claim 7, wherein the second supply rail is substantially at ground.

9. The apparatus of claim 8, wherein the drive circuit further comprises a plurality of half-H-bridges that are each coupled to at least one of the drive terminals.

10. The apparatus of claim 7, wherein the sense circuit further comprises a plurality of voltage sensors, wherein each voltage sensor is coupled to at least one of the drive terminals.

11. The apparatus of claim 10, wherein the control circuit further comprises:
    an analog-to-digital converter (ADC) that is coupled to the sense circuit;
    a processor having a memory with a computer program embodied thereon, wherein the processor is coupled to the ADC; and
    a controller that is coupled between the processor and drive circuit.

12. The apparatus of claim 11, wherein the sense circuit further comprises:

a switch network that is coupled to each voltage sensor; and
a comparator that is coupled to the switch network.

13. The apparatus of claim 11, wherein the drive circuit further comprises:
a pre-driver that is coupled to the controller; and
a driver that is coupled to the pre-driver and the sense circuit.

* * * * *